United States Patent [19]
Fenstermacher et al.

[11] Patent Number: 4,596,017
[45] Date of Patent: Jun. 17, 1986

[54] ELECTRON BEAM METHOD AND APPARATUS FOR OBTAINING UNIFORM DISCHARGES IN ELECTRICALLY PUMPED GAS LASERS

[75] Inventors: Charles A. Fenstermacher; Keith Boyer, both of Los Alamos, N. Mex.

[73] Assignee: The United States of America as represented by the United States Department of Energy, Washington, D.C.

[21] Appl. No.: 485,132

[22] Filed: Apr. 20, 1983

Related U.S. Application Data

[63] Continuation of Ser. No. 162,074, Jul. 13, 1971, abandoned.

[51] Int. Cl.[4] .............................................. H01S 3/09
[52] U.S. Cl. ...................................... 372/74; 330/4.3; 372/55; 372/86
[58] Field of Search ...................... 372/74, 86, 87, 55; 330/4.3

[56] References Cited

U.S. PATENT DOCUMENTS

| | | | |
|---|---|---|---|
| 2,686,275 | 8/1954 | Cohen | 315/10 |
| 3,491,309 | 1/1970 | Hill | 331/94.5 |
| 3,641,454 | 2/1972 | Krawetz | 331/94.5 |
| 3,702,973 | 11/1972 | Daugherty | 331/94.5 |

OTHER PUBLICATIONS

Sobolev et al., *Soviet Physics Uspekhi*, vol. 10, No. 2, Sep.–Oct. '67, pp. 153–157, 169–170.
*Canadian Electronics Engng.*, Feb. 1970, pp. 51–52.
Wood, "High-Pressure Pulsed Molecular Lasers", *Proceedings of the IEEE*, vol. 2, No. 3, Mar. 1974, pp. 355–397.
Persson, "Brush Cathode Plasm—A Well-Behaved Plasma", *Journal of Applied Physics*, vol. 36, No. 10, Oct. 1965, pp. 3086–3094.

*Primary Examiner*—James W. Davie
*Attorney, Agent, or Firm*—Samuel M. Freund; Paul D. Gaetjens; Judson R. Hightower

[57] ABSTRACT

A method and apparatus for obtaining uniform, high-energy, large-volume electrical discharges in the lasing medium of a gas laser whereby a high-energy electron beam is used as an external ionization source to ionize substantially the entire volume of the lasing medium which is then readily pumped by means of an applied potential less than the breakdown voltage of the medium. The method and apparatus are particularly useful in $CO_2$ laser systems.

19 Claims, 5 Drawing Figures

ELECTRON BEAM METHOD AND APPARATUS FOR OBTAINING UNIFORM DISCHARGES IN ELECTRICALLY PUMPED GAS LASERS

This invention is the result of a contract with the Department of Energy (Contract No. W-7405-ENG-36). It relates to a method and apparatus for the production of uniform electrical discharges in gas lasing media at atmospheric pressures and above and more particularly to a method and apparatus wherein a beam of high-energy electrons is used to initiate and sustain a uniform electrical discharge through substantially the entire volume of the lasing medium of a $CO_2$ laser at atmospheric pressures and above.

CROSS-REFERENCE TO RELATED APPLICATION

This is a continuation, application of application Ser. No. 162,074, filed July 13, 1971 abandoned.

U.S. application Ser. No. 40,037, filed May 25, 1970, by Barton Krawetz for "Electron Beam-Pumped Gas Laser System", U.S. Pat. No. 3,641,454.

BACKGROUND OF THE INVENTION

It is known in the art that the power of electrically excited, molecular discharge lasers, especially the $CO_2$ lasers, can be significantly improved if such lasers can be operated at atmospheric pressures and above. What is sought are means to provide more efficient excitation of the gas volume, i.e., more efficient and effective electrical pumping, greater energy density, uniform optical quality, and greater collisional line broadening. The problem presently is one of achieving uniform electrical discharges in the gas volume at high pressures, that is, atmospheric pressures and above. Mode-locked $CO_2$ gas lasers operating at pressures above one atmosphere and capable of producing laser pulses with energies in the $10^4$ to $10^6$ J range and having a time duration ranging from $10^{-11}$ to $10^{-9}$ second are useful in fusion initiation studies.

The art shows that attempts to achieve high current uniform discharges in laser gases at pressures of one atmosphere are most commonly directed toward mechanical subdivision of the discharge electrodes, with separate current sources for each subdivision. Thus, for example, laser pumping of $He:N_2:CO_2$ mixtures has been achieved at atmospheric pressure using transverse electrical discharges. The technique is characterized by fast ($\sim 1$-2 $\mu sec$) discharges between overvolted electrode structures which deposit electrical energy into the laser gas mixture in a time short compared with the arc formation time, although the latter stages of even these discharges may show formation of constricted arcs. The distribution of the electrical energy over a volume is accomplished by the use of multielectrode arrays in which each electrode has its own capacitor feed or has a ballast resistor to limit the current. More recently reported devices use dielectric-coated electrodes an double discharge circuits to produce a more or less uniform electron-ion plasma sheath to initiate the discharge.

These techniques seek to avoid or minimize the problems of high-current constricted arcs in self-sustained discharges through the use of fast discharges which deposit the energy into the gas before arcs or channeling can form. The instability mechanisms which lead to arc formation in self-sustained discharges are not well understood, but have been attributed to cathode processes involving field emission, local heating, and other spark charge distribution of the cathode electric field.

Arcing or channeling severely restricts the amount of energy that can effectively and efficiently be transferred to the laser gas through electrical pumping. It is highly desirable therefore to stabilize a plasma throughout substantially the entire volume of the laser gas for a time sufficient for efficient pumping to occur.

SUMMARY OF THE INVENTION

A plasma can be stabilized through substantially the entire volume of a high-pressure laser gas if the electron-ion production mechanism in the plasma is made independent of the electromagnetic field through use of an external ionization source consisting of a high-energy electron beam. In such an externally controlled plasma the applied electric field can be much lower than those required for self-sustaining discharges. Further, the average Townsend multiplication processes can be effectively zero, thus eliminating this breakdown mechanism. The dominant mechanism controlling this type of discharge is electron-ion volume recombination which determines the steady state electron-ion density for a given electron beam ionization production rate. Along with the drift velocities, this electron-ion density determines the current.

By this method, uniform discharges with path lengths of 30 cm are readily achieved in four-liter volumes of $CO_2$ laser mixtures at atmospheric pressures. The $CO_2$ gas mixtures may range from pure $CO_2$ to mixtures rich in helium and nitrogen. When an electron beam having an average current density of 0.05 A/$cm^2$ is injected into the volume for 10 $\mu sec$ and an electric field of up to 4 kV/cm is applied, currents up to 1000 A flow in the plasma through areas of 150 to 200 $cm^2$. An electrical energy density of about 300 J/liter is achieved in the gas and gain coefficients at a wavelength of 10.6 microns range from 0.01 $cm^{-1}$ for pure $CO_2$ to 0.05 $cm^{-1}$ for a mixture consisting of He, $N_2$, and $CO_2$ in a volume ratio of 3:1:1.

This method of producing large volume, high-energy, uniform electrical discharges in laser gas mixtures has the following features:

(1) The separation of electric field from the ionization required to carry the current allows the value of the electric field to be chosen to optimize the electron temperature for a given laser pumping process.

(2) The pumping time can be matched to the relaxation time of the gain to maximize the energy deposition.

(3) High pressures (atmospheric and above) can be used and hence higher energy densities can be obtained.

(4) The discharges are produced uniformly over larger volumes and longer distances than any previously reported.

(5) Various lasing mixtures may be used.

DETAILED DESCRIPTION OF THE PREFERRED EMBODIMENT

Figure 1:
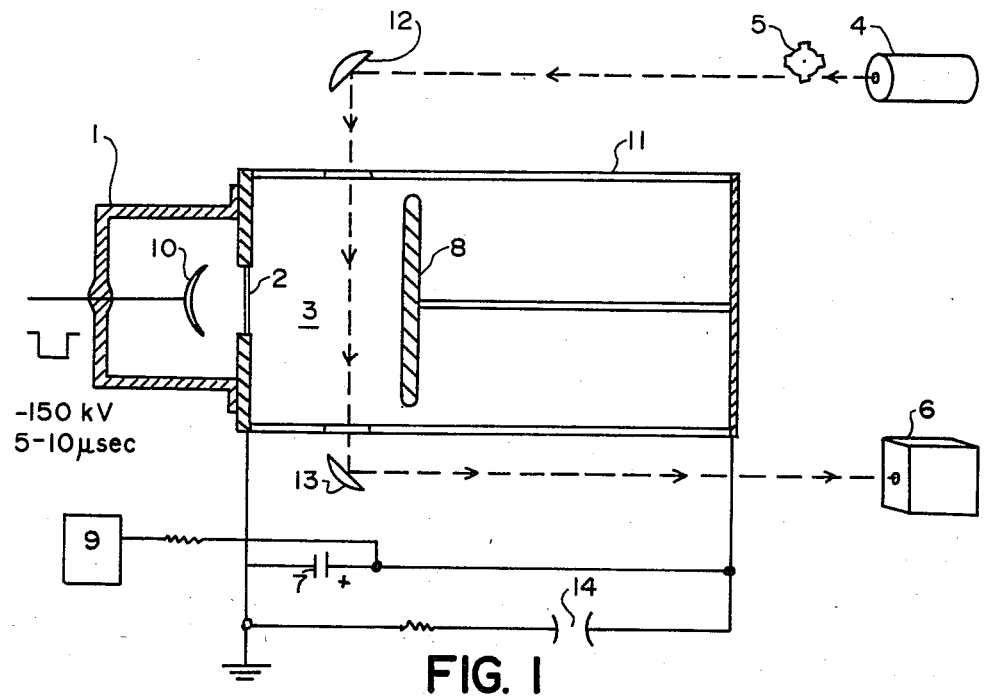
FIG. 1 shows an apparatus useful for measuring gain in lasing media at atmospheric pressure and above in which a uniform electrical discharge has been initiated and sustained by means of a high-energy electron beam operating in conjunction with charging electrodes.

As used within this application, small signal gain is a measurement of the optical ampification of the electrically pumped lasing medium made using a low intensity probe laser which does not significantly perturb the pumped lasing medium and does not extract any significant quantity of energy from the pumped lasing medium. Substantially ionized means that the number density of ion pairs produced in the lasing medium provides adequate conductivity to allow electrical energy to be deposited in the medium at a rate consistent with the relaxation rate of the population inversion of the medium.

The $CO_2$ system, which leads to laser action at 10.6 microns, has an extensive rotational structure which produces a series of very sharp lines in the P and R branch. In ordinary $CO_2$ laser systems operating at low pressure the pump energy is stored principally in the first vibrational state of nitrogen through electronic excitation produced by inelastic collisions. This energy is transferred to the upper lasing level in $CO_2$ by a collisional process and is shared by the various rotational lines so that approximately 1/15 of the energy is available to initiate laser action. The resulting line is doppler broadened to about 60 MHz. In order to produce and amplify pulses of $10^{-9}$ second or less with good efficiency, two requirements must be met. The line width in cycles must be larger than the reciprocal of pulse width in seconds in order to provide the required bandwidth in the medium and there must be sufficiently fast exchange of energy between the rotational levels so that all the energy stored in the upper vibrational state (001) of the $CO_2$ is available within the pulse time. At one atmosphere of pressure, the pressure broadening of the laser line is sufficient to amplify pulse widths of $3 \times 10^{-10}$ second and the rotational lines can exchange energy several times. At 10 atmospheres pressure the pressure broadening of the rotational lines results in sufficient line overlap to produce a single broad line including all the rotational levels. For this case, the medium is able to produce and amplify pulses less than $10^{-11}$ second in duration.

For a given pressure, the energy density stored in the upper lasing level of $CO_2$ is directly proportional to the small signal gain. For a given energy density, the small signal gain is inversely proportional to the pressure. It is doubtful that a small signal gain higher than 30 dB/m can be tolerated in a laser amplifier without prelasing and parasitic oscillations. At a pressure of 10 atmospheres, an energy density of 50 J/liter can be utilized without exceeding this limit. Thus, high pressure operation allow increased energy storage without corresponding increase in gain with its attendant problems.

In order to pump at 10 atmospheres pressure or higher by means of an electric discharge, it is essential to make the ionization process independent of the discharge characteristics so that independent control of the conductivity and the electron temperature can be maintained. The ionization is produced and maintained against recombination losses by means of a high energy electron beam while the proper voltage is applied across electrodes immersed in the medium sufficient to maintain the desired electron energy distribution but insufficient to produce further ionization. The pumping rate can then be controlled by adjusting the electron beam current density.

Figure 5:
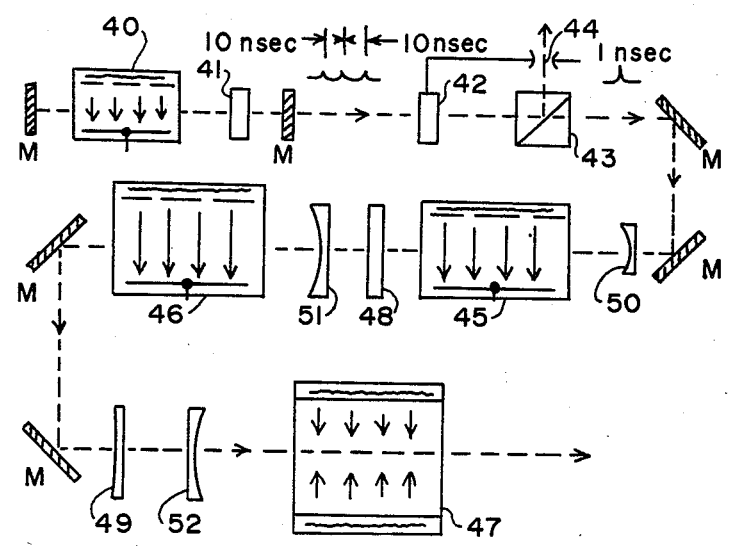
FIG. 5 is a schematic of a high-powered, pulsed $CO_2$ laser system utilizing the method and apparatus of this invention.

FIG. 5 is a practical embodiment of such a system which includes an oscillator 40, an active modulator 41 driven at the cavity frequency to produce a train of mode-locked pulses, a pulse switchout device comprising an electrooptic switch 42, an analyzer 43, and a laser-triggered spark gap 44 to select a single pulse followed by a series of amplifiers 45, 46, 47 of increasing size to provide the final output, separated by saturation isolators 48, 49, and beam diverger mirrors 50, 51, 52 for focusing the energy into the desired spot size. A gallium arsenide crystal is used for mode-locking and pulse switch-out device. Gas cells such as $SF_6$ or hot $CO_2$ are used as saturable isolators.

A problem with very short pulsed operation is that the time required to transfer energy from nitrogen to $CO_2$ is long compared to the pulse widths considered so that it is desirable to operate with a low nitrogen-$CO_2$ ratio to improve efficiency. Higher pressures shorten this transfer time and enhance the effective energy storage. It is, of course, evident that the same pumping technique can be used for a high powered laser oscillator to produce a high intensity pulse of a number of microseconds duration. In this situation, energy can be stored in nitrogen so that gain is not a problem and the energy density is only limited by heating of the gas. Precooling the gas by approximately 100° C. improves this situation.

The basic parameters of an electrically pumped $CO_2$ laser amplifier in which an electron beam is used to provide and control a uniform discharge in the lasing medium can be readily measured using the apparatus of FIG. 1. In electron gun 1 a collimated beam of electrons is produced at cathode 10 in a high vacuum and passes through window 2 into a volume 3 determined by the position and diameter of movable anode 8 in cylindrical chamber 11. As the electron beam passes through window 2 it interacts with the material of the window and the initial portion of the gas in volume 3 in such a manner as to disperse through substantially the entire volume 3. Lasing media comprising various mixtures of gases are introduced into chamber 11 by means not shown in FIG. 1. A continuous wave beam from a $CO_2$ probe laser 4 is chopped by a rotating wheel 5 and directed through volume 3 by mirror 12 and thence by means of mirror 13 to detector 6. Electric fields are applied to volume 3 from capacitor bank 7 charged from power supply 9 with window 2 acting as one charging electrode and anode 8 as the other.

Figure 2:
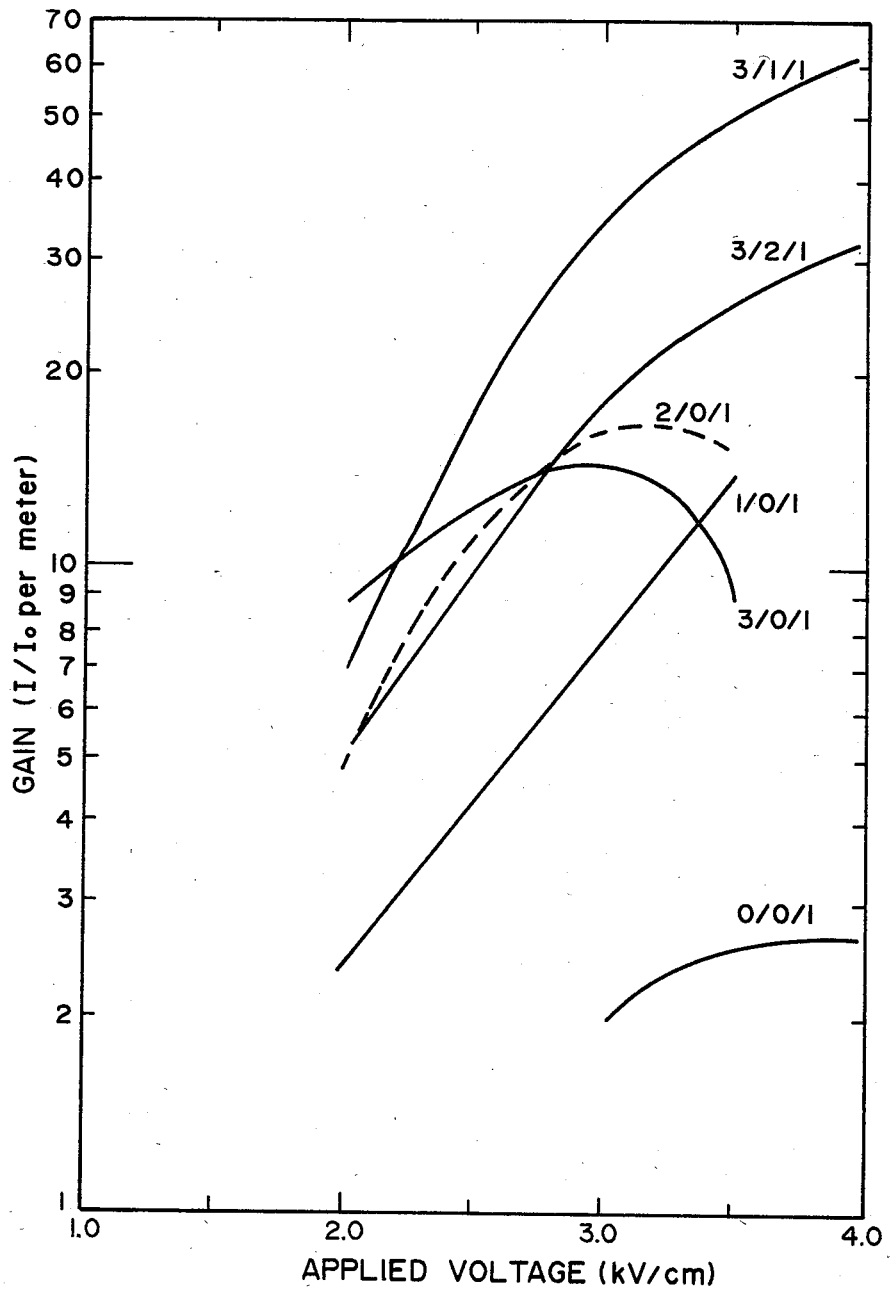
FIG. 2 shows the variation in gain with applied voltage for various He, $N_2$, and $CO_2$ mixtures at atmospheric pressure as determined in the apparatus of FIG. 1.
Figure 3:
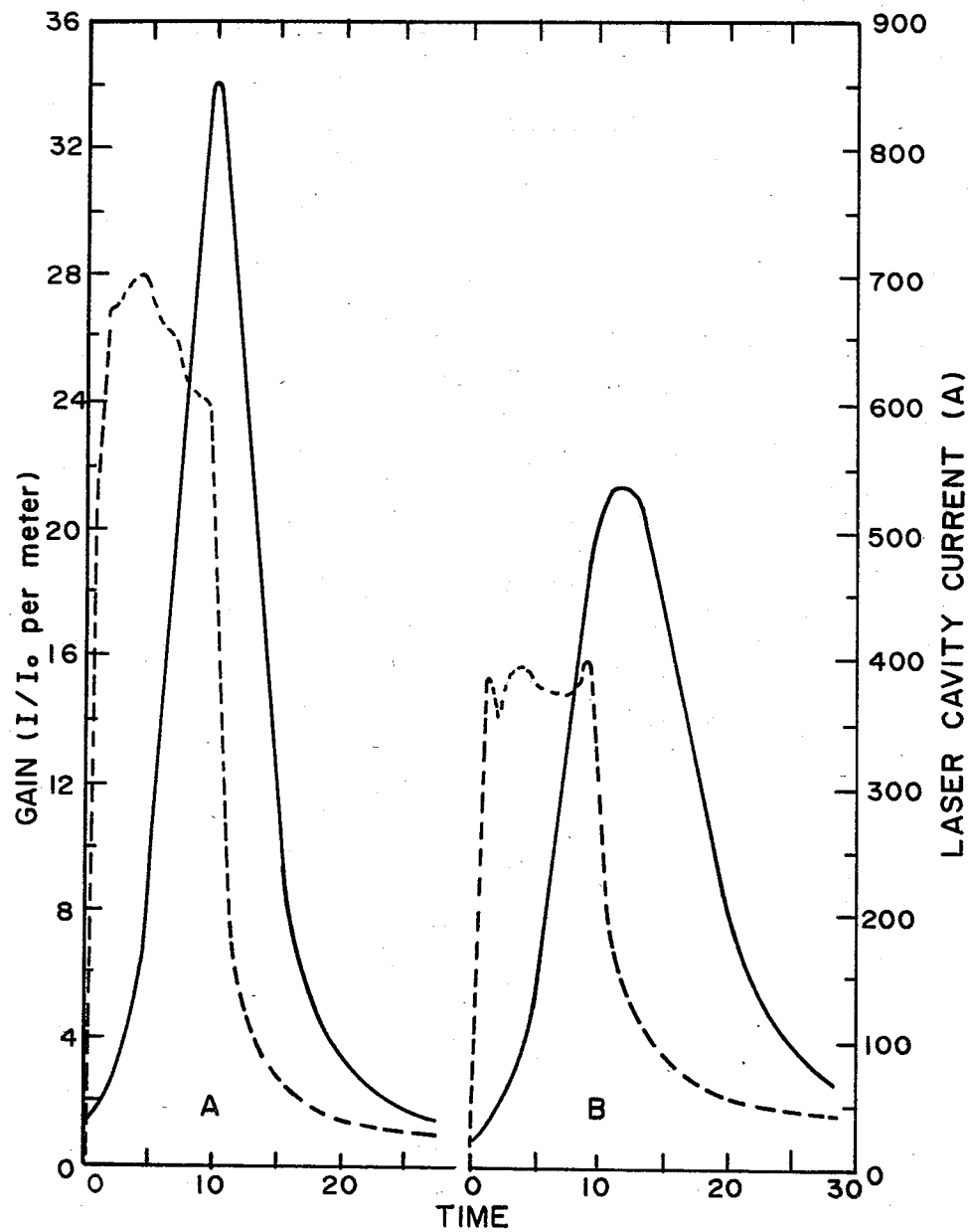
FIG. 3 shows the variation with time in gain and current in a 3:1:1 mixture by volume of He, $N_2$, and $CO_2$ at atmospheric pressure at an applied potential of 3 kV/cm for two electron beam currents.

The data of FIGS. 2 and 3 were obtained with the apparatus of FIG. 1 wherein electron gun 1 operating at 150 kV provided a 1.5 to 2 inch diameter collimated beam of electrons at a current of about 5 A through a 1-mil-thick aluminum window 2 in pulses of 5 to 10 μsec duration. The electron beam diffused through a volume 3 15 cm in diameter and 10 cm long containing various mixtures of He, $N_2$, and $CO_2$ gases at local atmospheric pressure (580 mm Hg). A continuous wave beam of about 0.5 W from a CO$_2$ laser 4 was chopped by rotating wheel 5 and directed through volume 3 and thence to an infrared detector 6. Electric fields of 2 to 4 kV/cm were applied to volume 3 from capacitor bank 7 charged from a 200 kV power supply 9 with window 2 acting as one electrode and a 15-cm-diameter aluminum plate 8 situated 10 cm in front of window 2 acting as the other electrode. Both polarities of applied electric field were used with no apparent difference in experimental results.

The apparatus of FIG. 1 is operated by turning on the probe laser and aligning it to pass through the volume containing the gas mixture to be ionized and pumped, introducing the desired gas mixture at local atmospheric pressure (although the apparatus may readily be operated at both higher and lower pressures), charging the capacitor bank connected to the charging electrodes, i.e., the window and the aluminum plate, to the test voltage, pulsing the electron gun for the, set 5 or 10 $\mu$sec at 150 kV, and then turning off the electric field by shorting the capacitor bank through a crowbar spark gap 14. The recorded output of the infrared detector is analyzed by comparing detector output produced with the ionized and pumped gas mixtures with that produced by the chopped cw laser signal alone.

Although this particular sequence was followed in obtaining the data of FIGS. 2 and 3, it is not thought to be essential that the charging electrodes be charged before the electron beam is passed through the gas mixture. Thus, for example, results similar to those shown in FIGS. 2 and 3 are obtained if the electrodes are charged simultaneously with the beginning of the electron beam pulse. It is also possible to begin the electron beam pulse befor the electric field is applied to the gas mixture.

In FIGS. 2 and 3 gain is defined as I/I$_o$ per meter where I$_o$ is unamplified probe laser intensity and I is amplified signal of the probe laser after passing through the pumped media. The effect on gain of varying the magnitude of the electric field across various gas mixtures at a pressure of about 580 torr is shown in FIG. 2. Each curve of FIG. 2 represents a particular mixture of helium, nitrogen, and carbon dioxide by volume. Thus the curve denominated 3/1/1 is for a gas composition containing 3 parts He, 1 part N$_2$, and 1 part CO$_2$ by volume.

FIG. 3 shows the variation with time in gain and current in the electrically pumped volume of a gas mixture containing a ratio of 3He:1N$_2$:CO$_2$ by volume having an electric field of 3 kV/cm across it. Gain is represented by the solid curves and current by the dashed curves. In part A the mixture was pulsed for 10 $\mu$sec with a 5 A beam, while in part B the mixture was pulsed for 10 $\mu$sec with a 3 A beam. The current curves in FIG. 3 are similar in shape to those produced by the electron beam itself. This indicates that the electron beam is effective not only to initiate and sustain a uniform discharge in the gas mixture but also acts effectively to control the discharge. An exhaustive parameter study has not been completed but the following general conclusions can be drawn:

1. For a given geometry there is an optimum electric field, gas mixture, gun current, and pulse duration to produce maximum gain.

2. As indicated in FIG. 3, inversions in certain gas mixture increase with increased electric field. A limit exists, however, such that the electric field should not exceed the value which produces Townsend multiplication and breakdown.

3. The energy of the electrons from the gun must exceed that required to pass through the window. However, since the cross section for production of secondary electrons increases with lower primary electron energy, to promote uniform ionization the electron energy after passing through the window should be significantly higher than that required to traverse the laser gas mixture. Consideration must be given to the energy deposited in the window by the electrons passing through lest the window suffer damage from heating.

4. The inversion in a given gas mixture increases with increased electron beam current for a given electric field and pressure. The optimum pumping time varies with electron beam current and gas mixture for a given geometry.

Figure 4:
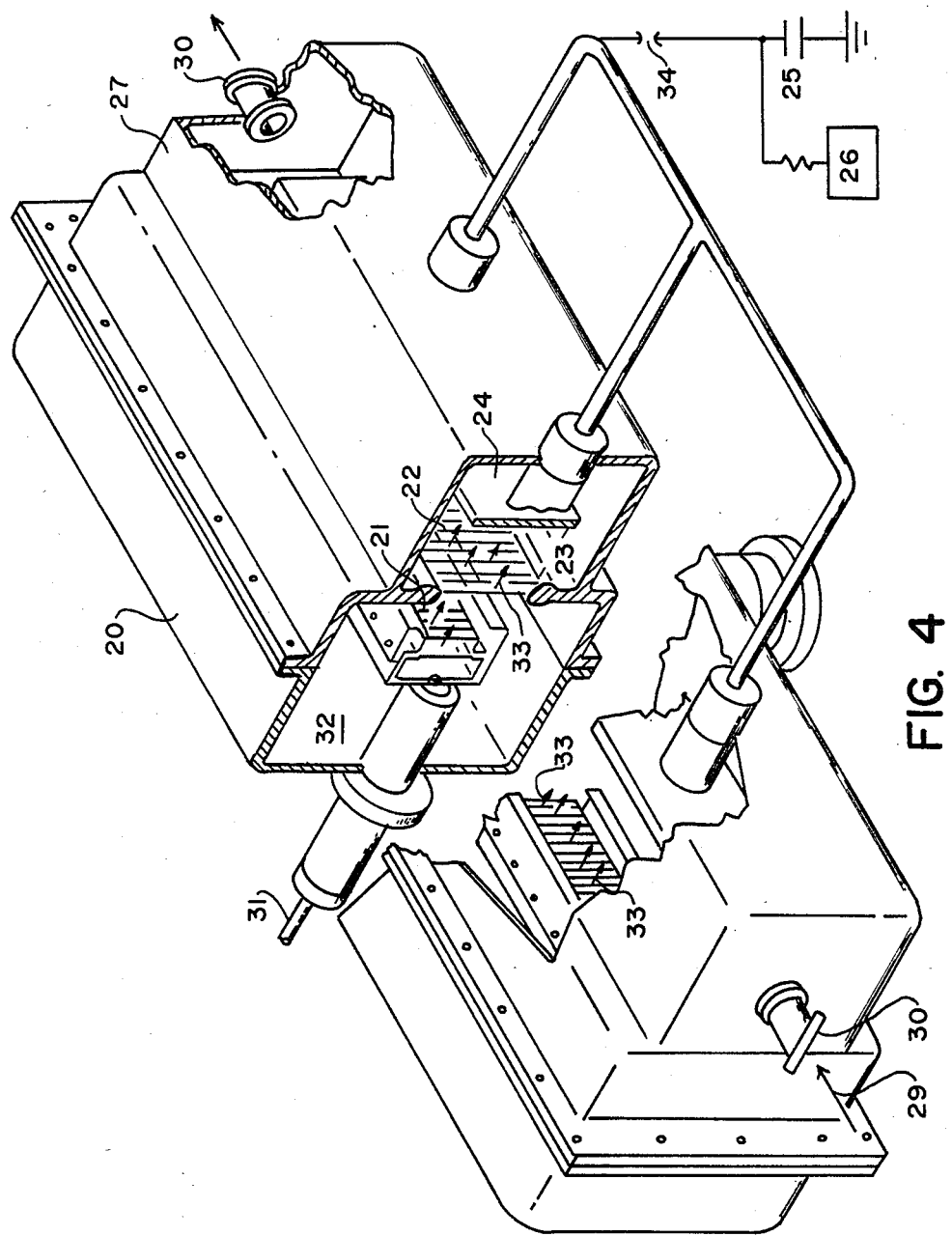
FIG. 4 is an embodiment of an electrical-discharge gas laser system in which an electron beam is used as an external ionization source to provide a uniform, high-energy, large-volume discharge in the lasing medium.

An embodiment of a laser amplifier in which a uniform, high-energy discharge is achieved throughout substantially the entire volume of the lasing medium is shown in FIG. 4. An electron gun 20 consisting of an assembly approximately 1 meter long of heated tungsten filaments 21 1 cm apart supported in a vacuum chamber 32 approximately 5 cm from a window 22 of a 0.5-mil-thick titanium provides a uniform beam of electrons 33 up to 1 A/cm$^2$ with a cross section 5 cm wide by 1 meter long into optical cavity 23 containing a mixture of He, N$_2$, and CO$_2$ at a pressure of one to 10 atmospheres. Electron beam 33 is driven for 5 or 10 $\mu$sec duration by means of 150 kV pulser 31. Anode 24 driven by capacitor bank 25 charged by power supply 26 is supported in insulated box 27 which forms optical cavity 23. The electric field is terminated at a desired time by means of spark gap 34. Entrance to optical cavity 23 for light beam 29 to be amplified is provided by Brewster angle windows 30 at each end of insulating box 27. The apparatus of FIG. 4 provides a uniform electrical discharge through a volume of lasing medium 5 cm by 5 cm by 1 meter.

While a particular embodiment of this invention is illustrated in FIG. 4, it will be understood that the appended claims are not to be limited to this particular embodiment but are intended to cover such modifications and changes to the apparatus as would be apparent to one of reasonable skill in the art. It will be further understood that although the lasing media disclosed by example herein have been limited to mixtures of He, N$_2$, and CO$_2$, the gas lasing media to which the invention is applicable are not to be so limited. Thus Wood et al. in Applied Physics Letters, Vol. 18, p. 261 (1971), disclose high-pressure laser action in 13 gases by transverse excitation. The present method and apparatus are applicable to any gas which lases through atomic or molecular transitions. Finally, it will be apparent that the electrode configurations illustrated herein are desirable but not critical, and various other configurations may readily be used. In addition, dispersal means may be added to the apparatus whereby the electron beam is made to conform substantially to the cross-sectional area of the volume to be pumped.

What we claim is:

1. A method for producing a population inversion in a laser gas medium suitable for supporting laser oscillation and amplification therein by initiating and sustaining a large-volume, high-energy, uniform electrical discharge therein at atmospheric pressure and above, which comprises the steps of: pressurizing the laser gas medium to pressures greater than or equal to one atmosphere and defining thereby a volume of the laser gas medium; impressing an electrical voltage across the volume of the laser gas medium, the voltage being less than the breakdown voltage of the medium yet sufficient to produce a substantially uniform high-energy discharge in the medium when the medium is ionized without generating substantial additional ionization in the laser gas medium; and passing a high-energy electron beam through substantially the entire volume of the laser gas medium for a sufficient time period to produce ionization of the medium, whereby a population inversion suitable for laser oscillation and amplification is generated thereby.

2. The method according to claim 1, wherein the voltage impresses across ihe volume of the laser gas medium is chosen to optimize the population inversion therein and the electron beam has a current density sufficient to produce substantial uniform ionization throughout the volume of the medium thereby maximizing the population inversion therein.

3. The method as described in claim 1, wherein the electron beam is passed through the laser gas medium after the voltage is impressed across the medium.

4. The method as described in claim 1, wherein the laser gas medium consists essentially of a mixture of He, $N_2$ and $CO_2$, wherein the impressed voltage across the volume of the laser gas medium derives from an electric field of about 3 kV/cm impressed thereon, and wherein the electron beam is passed through the medium for an about 10 $\mu$sec time period while the electric field is impressed across the medium.

5. The method as described in claim 4, wherein the laser gas mixture contains the gaseous components thereof in the approximate ratio of 3 parts He, 1 part $N_2$ and 1 part $CO_2$ by volume.

6. A method for storing electrical energy in a $CO_2$ molecular laser gain medium while keeping the small signal gain below about 30 dB/m for amplifying laser oscillations from a carbon dioxide laser substantially without attendant prelasing and parasitic oscillations, which method comprises the steps of: pressurizing the gaseous carbon dioxide lasing medium to a pressure of 1 to 10 atmospheres, the lasing medium consisting essentially of a mixture of He, $N_2$ and $CO_2$, defining thereby a volume thereof; impressing an electrical voltage across the volume of the gaseous carbond dioxide lasing medium having a value less than the breakdown voltage of the carbon dioxide lasing medium yet sufficient to produce a high-energy discharge in the carbon dioxide lasing medium when the medium is ionized without generating substantial additional ionization in the carbon dioxide lasing medium; and passing a high-energy electron beam through substantially the entire volume of the carbon dioxide lasing medium for a sufficient time period to produce ionization of the medium, whereby a population inversion suitable for amplification of carbon dioxide laser radiation is generated thereby.

7. A method for storing electrical energy in a $CO_2$ molecular laser gain medium while keeping the small signal gain below about 30 dB/m for amplifying laser oscillations from a carbon dioxide laser substantially without attendant prelasing and parasitic oscillations, which method comprises the steps of: pressurizing the gaseous carbon dioxide lasing medium to a pressure of 1 to 10 atmospheres consisting essentially of $CO_2$, defining thereby a volume thereof; impressing an electrical voltage acriss the volume of the gaseous carbon dioxide lasing medium having a value less than the breakdown voltage of the carbon dioxide lasing medium yet sufficient to produce a high-energy discharge in the carbon dioxide lasing medium when the medium is ionized without generating substantial addition ionization in the carbon dioxide lasing medium; and passing a high-energy electron beam through substantially the entire volume of the carbon dioxide lasing medium for a sufficient time period to produce ionization of the medium, whereby a population inversion suitable for amplification of carbon dioxide laser radiation is generated thereby.

8. An electrical discharge gas laser apparatus comprising in combination: an optical resonator; a gas-tight enclosure having a gaseous lasing medium therein and being adapted for cooperating with said optical resonator, whereby laser oscillations generated in the lasing medium traveling substantially along the axis of said optical resonator experience amplification producing thereby laser radiation; pressurizing means for achieving pressures between about 1 and 10 atmospheres within said enclosure; electron accelerator means for generating and directing a beam of high-energy electrons through said enclosure, said electrons traversing substantially the entire volume of the lasing medium, interfacing therewith and generating substantial ionization therein; at least one pair of spaced-apart, substantially parallel electrodes within said optical resonator substantially surrounding the laser gain medium at least one electrode thereof capable of permitting the high-energy electrons to pass therethrough in order to interact with the lasing medium; and means electrically connected to said electrodes for impressing across them a voltage less than the breakdown voltage of the lasing medium yet sufficient to produce a high-energy uniform discharge in the lasing medium when the lasing medium is substantially ionized without generating substantial additional ionization therein, whereby a population inversion is produced in the lasing medium suitable for laser oscillation and amplification.

9. The laser system as described in claim 8, further comprising timing means whereby said electrodes are charged before the electron beam passes thr6ugh the medium.

10. The laser system as described in claim 8, further comprising timing means whereby said electrodes are charged simultaneously with the passage of the electron beam through the lasing medium.

11. The laser system as described in claim 8, wherein said enclosure further comprises a vessel having Brewster angle windows in oppositely positioned endwalls, and wherein the sidewall thereof facing said electron accelerator means is substantially transparent to the high-energy electrons.

12. The laser system as described in claim 11, wherein the sidewall of said enclosure facing said electron accelerator means simultaneously serves as one electrode of said at least one pair of electrodes and the anode of said electron accelerator means.

13. The laser system as described in claim 8, wherein said electron accelerator means further comprises beam dispersal meand for dispersing the electron beam generated thereby through substantially the entire volume of said enclosure located between said at least one pair of electrodes.

14. The apparatus as described in claim 8, wherein said voltage impressing means includes a capacitor bank and means for charging said capacitor bank.

15. The laser system as described in claim 8, wherein the lasing medium consists essentially of a mixture of He, N$_2$ and CO$_2$, and wherein said enclosure is pressurized to a pressure of about 1 atmosphere therewith.

16. The laser system as described in claim 15, wehrein the mixture contains the gaseous components thereof in the approximate ratio of 3 parts He, 1 part N$_2$ and 1 part CO$_2$ by volume.

17. The laser system as described in claim 8, wherein the lasing medium consists essentially of pure CO$_2$.

18. The laser system as described in claim 17, wherein said enclosure is pressurized with the lasing medium to a pressure of about 1 atmosphere.

19. An electrical-discharge gas laser amplifier system comprising in combination: a gas-tight enclosure having a gaseous lasing medium therein at a pressure between 1 and 10 atmospheres, said enclosure having at least one wall thereof substantially permeable to high-energy electrons directed thereat; means for pressurizing said enclosure to a chosen pressure of gaseous lasing medium: at least one pair of spaced apart, substantially parallel electrodes located within the gaseous lasing medium and defining a volume of lasing medium; electron accelerator means for generating and directing a beam of high-energy electrons through the permeable wall of said enclosure, the high-energy electron beam therefrom having sufficient energy to produce substantial ionization in substantially the entire volume defined by said electrodes of the gaseous medium therebetween: means for impressing a voltage across said at least one pair of electrodes which is less than the breakdown voltage of the lasing medium yet sufficient to produce a high-energy, uniform discharge therein without generating substantial additional ionization therein when the gaseous lasing medium is substantially ionized, whereby a population inversion is generated therein, and means for directing a beam of laser radiation through the volume of the gaseous lasing medium in which the population inversion has occurred, whereby amplification thereof occurs.

* * * * *